United States Patent
Zuber (10) Patent No.: US 9,583,932 B2
(45) Date of Patent: Feb. 28, 2017

(54) CABLE STORAGE DEVICE FOR A CHARGING CABLE OF AN ELECTRIC VEHICLE

(71) Applicant: FORD GLOBAL TECHNOLOGIES, LLC, Dearborn, MI (US)

(72) Inventor: Gerd Zuber, Kerpen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 14/242,224

(22) Filed: Apr. 1, 2014

(65) Prior Publication Data
US 2014/0305759 A1    Oct. 16, 2014

(30) Foreign Application Priority Data
Apr. 16, 2013 (DE) .......... 10 2013 206 761

(51) Int. Cl.
*H02G 11/02* (2006.01)
*B60L 11/18* (2006.01)

(52) U.S. Cl.
CPC .......... *H02G 11/02* (2013.01); *B60L 11/1816* (2013.01); *B60L 2230/12* (2013.01); *Y02T 10/7005* (2013.01); *Y02T 10/7088* (2013.01); *Y02T 90/121* (2013.01); *Y02T 90/14* (2013.01)

(58) Field of Classification Search
CPC .... H02G 11/00; H02G 11/003; H02G 11/006; H02G 11/02
USPC ............... 191/12 R, 12.2 R, 12.4, 12.2 A
See application file for complete search history.

(56) References Cited

U.S. PATENT DOCUMENTS

| 5,299,670 A | 4/1994 | Willard | |
|---|---|---|---|
| 2007/0241224 A1* | 10/2007 | Nagler | B65H 75/4407 242/397.3 |

FOREIGN PATENT DOCUMENTS

| EP | 778239 A1 | 6/1997 | |
|---|---|---|---|
| EP | 0778239 | * 11/1997 | ............. B65H 75/44 |
| WO | 2011/054752 A2 | 5/2011 | |
| WO | WO 2011054752 | * 5/2011 | ............. H02G 11/02 |
| WO | 2012/031617 A1 | 3/2012 | |
| WO | 2012/069032 A2 | 5/2012 | |

* cited by examiner

*Primary Examiner* — R. J. McCarry, Jr.
(74) *Attorney, Agent, or Firm* — Carlson, Gaskey & Olds (57) ABSTRACT

The disclosure relates to a cable storage device for a charging cable of a rechargeable battery of an electric vehicle. The cable storage device includes a rotatable drum onto which the charging cable can be wound. The drum is mounted in a rotatable manner on a rotationally fixed shaft. The shaft includes an external thread, and the drum includes an internal thread which engages the external thread.

25 Claims, 6 Drawing Sheets

CABLE STORAGE DEVICE FOR A CHARGING CABLE OF AN ELECTRIC VEHICLE

CROSS-REFERENCE TO RELATED APPLICATIONS

This application claims priority to German Application No. 102013206761.5, which was filed on Apr. 16, 2013, the entire contents of which are expressly incorporated herein by reference.

BACKGROUND AND SUMMARY

The present disclosure relates to a cable storage device for an electrical charging cable of a rechargeable battery of a hybrid or battery-operated electric vehicle, and also to a hybrid or battery-operated electric vehicle, in particular an electric car, having a cable storage device of this kind.

An electric vehicle and also a cable storage device for an electrical charging cable of a rechargeable battery of a hybrid or battery-operated electric vehicle, in particular of an electric car, of the kind cited in the introductory part are known, for example, from WO 2012/031617 A1. A rotatable drum, onto the circumferential surface of which the charging cable can be wound, has, on the circumferential surface, a groove-like guide profile which runs in the form of a helix and which receives the charging cable. The drum is accommodated in a protective pipe. The protective pipe has a longitudinal slot through which the charging cable is passed. A sleeve part which surrounds the protective pipe and can be displaced along the drum and has a passage opening for the charging cable is provided for improved guidance of the charging cable during winding and unwinding. A slotted-link control device, such as a nut, is provided for axially displacing the sleeve part relative to the drum. The slotted-link control device can be screwed onto the guide profile of the drum to displace the sleeve part over a slotted-link block which is guided through the longitudinal slot in the protective pipe when the drum rotates.

Furthermore, DE 10 2009 046 327 A1 discloses an apparatus for electrically connecting an electric vehicle to a power tap point which likewise provides a cable drum which is mounted such that it can rotate on a stationary vehicle structure. In order to guide the charging cable in an ordered manner when winding the charging cable onto or unwinding the charging cable from the drum, the apparatus has an oscillator which receives the charging cable in a passage opening and is mounted such that it can move in the direction of the drum axis on a guide shaft which is driven in rotation. The oscillator can additionally be forcibly guided on the guide shaft by a slotted-link control device.

DE 10 2010 061 892 A1 discloses a charging device for an electric vehicle having a charging cable and a rotatably mounted cable drum. The charging cable is wound onto the cable drum in a two-dimensional manner for the purpose of winding the charging cable onto and unwinding the charging cable from the cable drum in an ordered manner. The drum has two lateral boundaries for the wound-on charging cable, with the distance between the two lateral boundaries being smaller than twice the diameter of the charging cable.

U.S. Pat. No. 5,299,670 discloses a telephone cable retractor which comprises a cylindrical, hollow cable drum with a helically running channel which is made on the circumferential surface of the cable drum and in which the telephone cable can be received. The retractor further comprises a cable guide which is guided on a rail. The cable guide has a projection which interacts with the helical channel in the cable drum in such a way that the cable guide is moved on the rail in the axial direction of the cable drum when the cable drum rotates, in order to thereby insert the telephone cable into the helical channel in an ordered manner. The retractor has a rotary spring, which is fitted within the hollow cable drum, for winding the telephone cable onto the cable drum.

Against this background, one object of the present disclosure is to provide a cable storage device for an electrical charging cable of a rechargeable battery of a hybrid or battery-operated electric vehicle which provides an alternative to the known prior art, and also a hybrid or battery-operated electric vehicle, in particular an electric car, having a cable storage device of this kind, which allows the charging cable to be wound onto and unwound from a cable drum in a simple and convenient manner, in particular in an ordered manner, with the cable and the cable storage device having a relatively long service life.

This object is achieved by a cable storage device having the features described by claim 1. The object is further achieved by an electric vehicle having the features of claim 11 as well as the method described by claim 16. Further, particularly advantageous refinements of the disclosure are disclosed in the respective dependent claims.

It should be noted that the features listed individually in the claims can be combined with one another in any desired, technically reasonable manner and form further refinements of the disclosure. The description additionally characterizes and specifies the disclosure, in particular in connection with the figures.

According to one non-limiting embodiment, a cable storage device for an electrical charging cable of a rechargeable battery of a hybrid or battery-operated electric vehicle, such as an electric car, has a rotatable drum onto the circumferential surface of which the charging cable can be wound. Furthermore, the drum is mounted in a rotatable manner on a rotationally fixed shaft, with the shaft having an external thread, and the drum having an internal thread which engages the external thread. In other words, rotary movement of the drum therefore likewise leads to an axial displacement movement of the drum in relation to the shaft. In this way, a movable cable guide for winding the charging cable onto or unwinding the charging cable from the drum in an ordered manner, as is known from the prior art mentioned in the introductory part for example, can be dispensed with, as a result of which the design of the cable storage device is simplified. Winding the charging cable onto or unwinding the charging cable from the drum in an ordered manner can be realized solely by the axial displacement movement of the drum in relation to the stationary shaft.

According to another embodiment of the disclosure, the drum has axial ends at each of which a drum end disk is arranged. The diameter of the drum end disk is greater than the diameter of the drum. The drum end disks define the axial section of the drum in which the charging cable can be wound on (wind-on section), and therefore prevent the charging cable from being wound on outside this section.

A further embodiment of the disclosure makes provision for the drum end disks to be mounted in an axially displaceable and rotationally fixed manner in relation to the shaft, with the drum end disks being rotatably connected to the respective axial ends of the drum. Therefore, the entire axial wind-on section of the drum, which section is defined by the drum end disks, is displaced in the axial direction of the shaft when the charging cable is wound on or unwound, but with the drum end disks not rotating relative to the shaft during the axial displacement movement of the drum. The arrangement of the drum end disks in a rotationally fixed manner in relation to the shaft allows the drum end disks to be provided with functions other than that of defining the wind-on section.

Therefore, in another embodiment, at least one tension spring element is provided, the direction of the action of force of the tension spring element running substantially parallel to the axis of the shaft and the tension spring element acting on an end face of the drum end disk. In particular, the tension spring element preferably acts on the end face of the drum end disk in such a way that the tension spring element is pulled and stretched when the charging cable is unwound from the drum and therefore during the corresponding axial displacement movement of the drum end disks away from one another. The process of winding the charging cable onto the drum is assisted in this way since the tension spring element pulls the drum in the direction of the axial displacement direction of the drum which corresponds to the winding-on operation.

According to yet another embodiment, the drum end disks each have a recess which extends radially inward from their circumferential surfaces and into which a second, stationary shaft which runs parallel to the axis of the shaft and causes the drum end disks to be mounted in a rotationally fixed manner in relation to the shaft engages.

In order to assist the process of winding the charging cable onto and unwinding the charging cable from the drum in an ordered manner, a groove-like guide profile for receiving the charging cable is formed on the circumferential surface of the drum according to a yet another embodiment. In such an embodiment, the guide profile runs in a helical manner around the outside of the drum.

According to another embodiment, the radial depth of the recess is such that the shortest distance between the circumferential surface of the second shaft and the circumferential surface of the charging cable which is received in the guide profile is smaller than the diameter of the charging cable. This prevents the charging cable which is wound onto the drum from being able to slip, for example, out of one guide groove into an adjacent guide groove.

A further embodiment of the disclosure makes provision for the drum to be arranged in a housing which surrounds the charging cable in the state in which the charging cable is wound onto the drum, with the housing having a passage opening for pulling out the cable. The charging cable is therefore protected against soiling. Rotatable rollers can be provided at the passage opening in the housing, the rotatable rollers allowing the charging cable to be easily pulled out of the housing and, in the process, likewise preventing damage to the charging cable, for example by the edges of the passage opening. Furthermore, brush or wiper elements can likewise be provided in the edge region of the passage opening, the brush or wiper elements serving to remove particles of dirt from the charging cable.

A further embodiment of the disclosure provides a switching mechanism which establishes an electrical connection between the charging cable and the rechargeable battery as soon as the charging cable is completely unwound from the drum and otherwise disconnects the electrical connection. This prevents a portion of the charging cable which is still wound onto the drum from forming an electrical coil during the charging process. A switching mechanism of this kind can be realized, for example, by one of the two drum end disks by the one of the two drum end disks establishing the electrical contact between the charging cable and the rechargeable battery which is to be charged when it reaches its axial end position in which the entire charging cable is unwound from the drum.

A hybrid or battery-operated electric vehicle according to the disclosure, in particular an electric car, is characterized by the presence of a cable storage device such as described in this disclosure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

In the various figures, identical parts are always provided with the same reference symbols, and therefore the reference symbols will generally be described only once.

Figure 1:
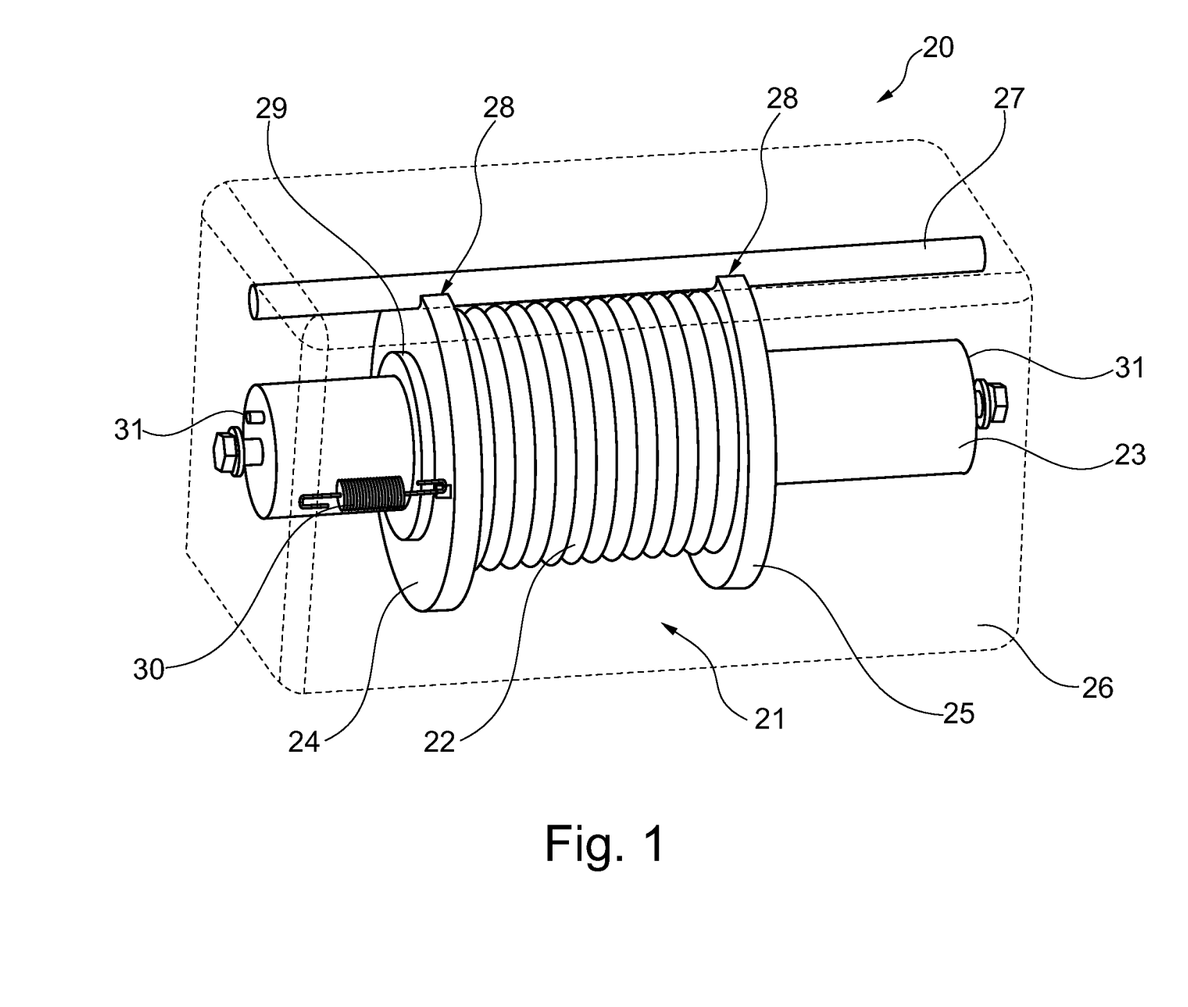
FIG. 1 schematically shows a perspective view of an exemplary embodiment of a cable storage device according to the disclosure.

FIG. 1 illustrates a perspective view of an exemplary embodiment of a cable storage device 20. The cable storage device 20 includes a rotatable drum 21 onto which an electrical charging cable 22 of a rechargeable battery (not illustrated in FIG. 1) of a hybrid or battery-operated electric vehicle (likewise not illustrated), in particular an electric car, can be wound. The drum 21 is mounted on a rotationally fixed shaft 23 in a rotatable manner. The shaft 23 has an external thread (not illustrated in FIG. 1) which engages an internal thread (likewise not visible in FIG. 1) of the drum 21.

As shown in FIG. 1, the drum 21 has axial ends on which a first drum end disk 24 and a second drum end disk 25 are arranged. The diameter of the drum end disks 24, 25 is greater than the diameter of the drum 21. In this way, the drum end disks 24, 25 define an axial section of the drum 21 in which the charging cable 22 can be wound onto the drum 21.

Furthermore, the drum 21 is arranged in a housing 26 which surrounds the charging cable 22 in the state in which the charging cable is wound onto the drum 21.

The drum end disks 24, 25 are mounted in an axially displaceable and rotationally fixed manner in relation to the shaft 23, with the drum end disks 24, 25 being rotatably connected to the respective axial ends of the drum 21. As shown in FIG. 1, in the illustrated exemplary embodiment of the cable storage device 20, the rotationally fixed mounting of the drum end disks 24, 25 in relation to the shaft 23 is realized by the drum end disks 24, 25 being held in the tangential direction and being guided in an axial direction by a second stationary shaft 27 which runs parallel to the shaft 23. To this end, the second shaft 27 is held on the housing 26 at one end and engages in corresponding recesses 28 in the drum end disks 24, 25 at the other end, the recesses extending radially inward from the respective circumferential surfaces of the drum end disks 24, 25.

In the position of the cable storage device 20 illustrated in FIG. 1, the charging cable 22 is completely wound onto the drum 21. In this position, the first drum end disk 24 bears against a disk-like stop 29 which is fixedly connected to the shaft 23. This stop 29 defines the axial position of the drum 21 on the shaft 23 when the charging cable 22 is completely wound on.

Furthermore, the exemplary embodiment illustrated in FIG. 1 shows that a tension spring element 30, of which the direction of the action of force runs substantially parallel to the axis of the shaft 23, acts on an end face of the drum end disk 24. In particular, the tension spring element 30 is arranged between a wall of the housing 26 and the end face of the drum end disk 24 and, at its ends, is connected to the wall and end face for this purpose.

Furthermore, FIG. 1 shows that pin-like holding elements 31 are formed on the end surfaces of the shaft 23. The pin-like holding elements 31 engage corresponding pin-like recesses in the housing 26. The holding elements 31 serve to prevent rotation of the shaft 23 in the housing 26.

Figure 2:
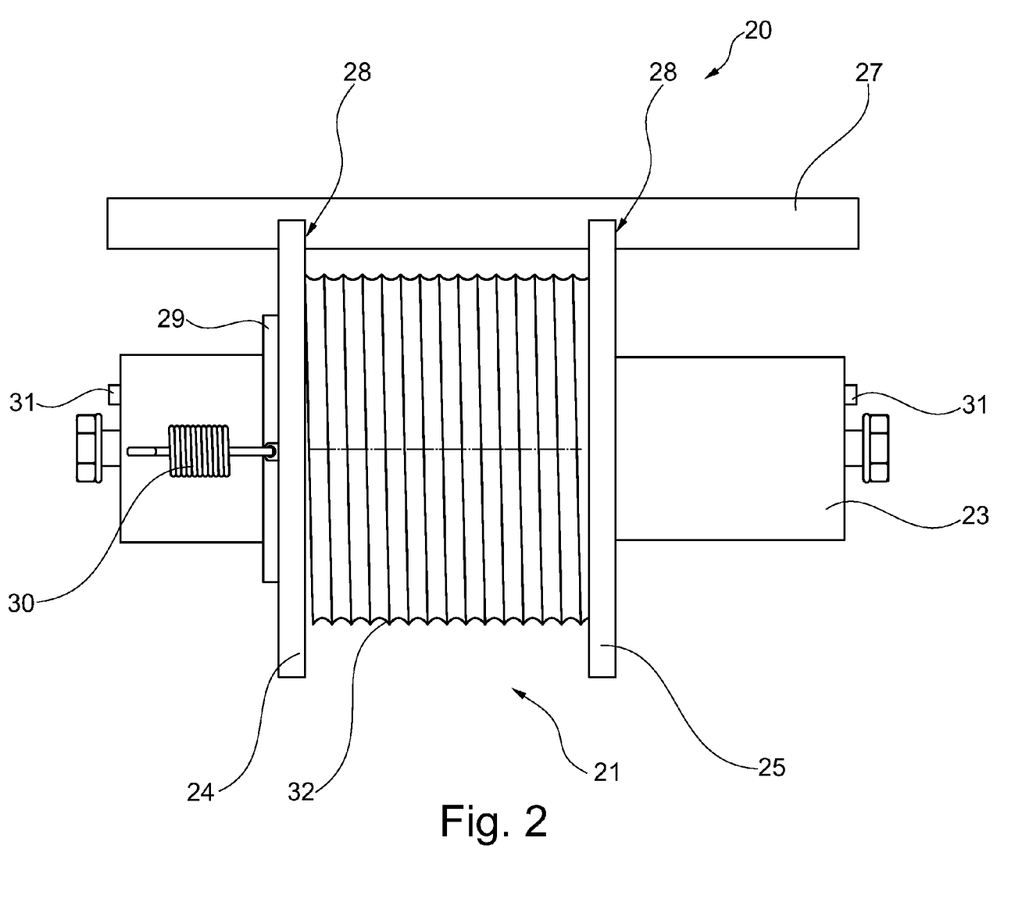
FIG. 2 schematically shows a rear view of the cable storage device illustrated in FIG. 1.

FIG. 2 illustrates a view of the cable storage device 20 illustrated in FIG. 1 from the rear, without the housing 26. The charging cable 22 is likewise not illustrated in FIG. 2, and therefore a groove-like guide profile 32 which is formed on the drum 21 can be seen. The groove-like guide profile runs in a helical manner around the outside of the drum 21. The width of the guide profile 32 is matched to the diameter of the charging cable 22 in such a way that the charging cable 22 is received by the guide groove in a precise manner.

Figure 3:
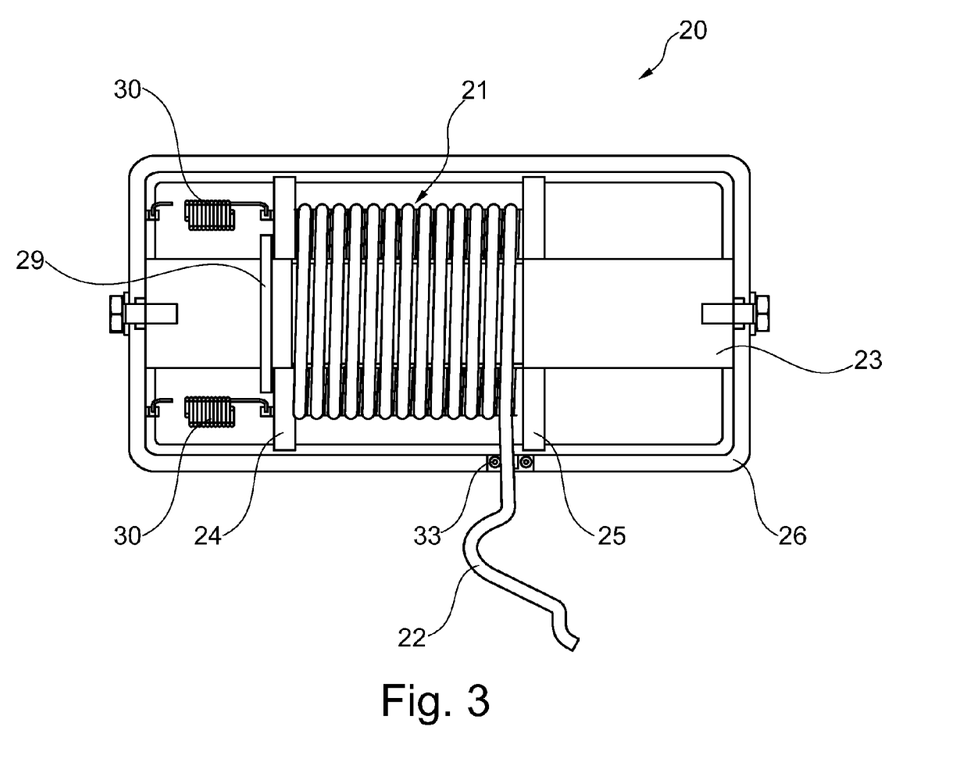
FIG. 3 schematically shows a view of the cable storage device illustrated in FIG. 1 from below in a first operating position.

FIG. 3 illustrates a view of the cable storage device 20 illustrated in FIG. 1 from below in a first operating position. In this first operating position, the charging cable 22 is completely wound onto the drum 21 and the drum end disk 24 bears against the stop 29 of the shaft 23. The tension spring elements 30 are in a virtually relaxed state. As illustrated in FIG. 3, the charging cable 22 is guided out of the housing 26 through a passage opening 33 for pulling out the cable.

Figure 4:
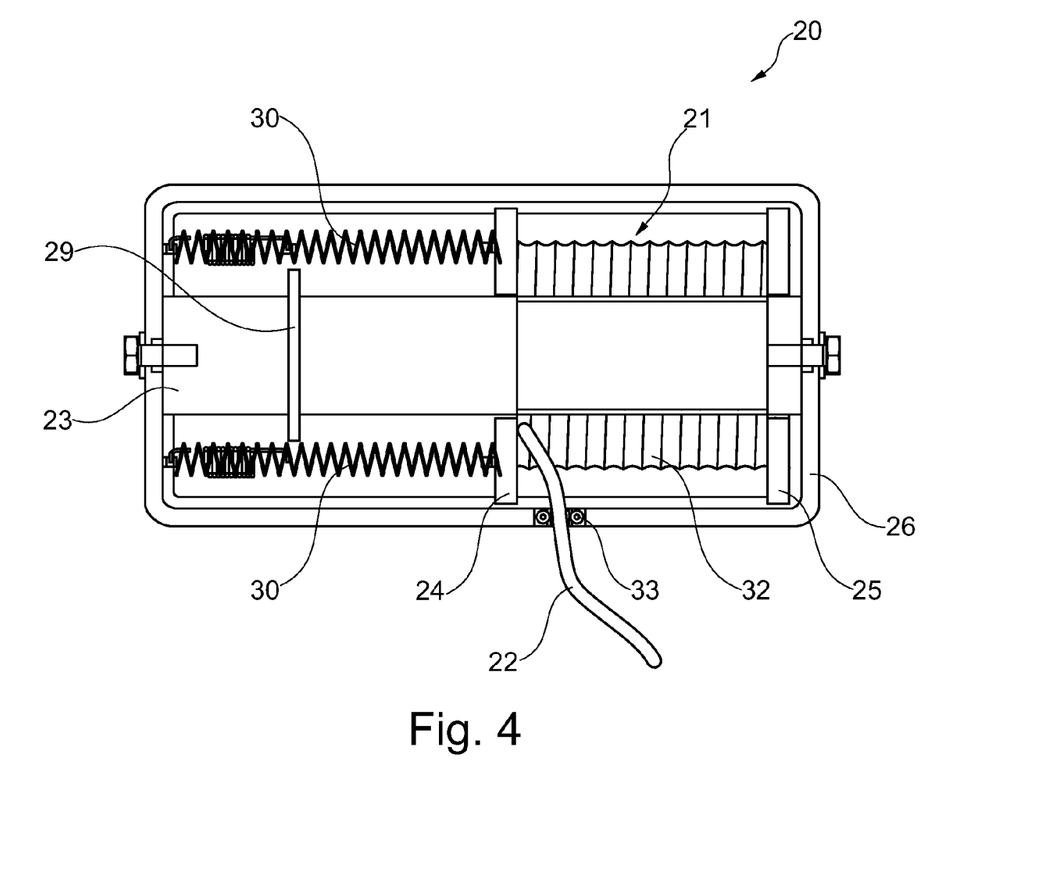
FIG. 4 schematically shows a view of the cable storage device illustrated in FIG. 3 from below in a second operating position.

FIG. 4 illustrates the cable storage device 20 illustrated in FIG. 3 in a second operating position in which the charging cable 22 is completely unwound from the drum 21. In the illustrated state, the drum end disk 25 bears against the inner wall of the housing 26. The drum 21 is preferably locked in this state by device of a locking mechanism (not illustrated). The locking mechanism can be released again, such as by again pulling on the charging cable 22, so that the charging cable 22 can be wound onto the drum 21 again.

In the exemplary embodiment of the cable storage device 20 illustrated in FIG. 4, the drum end disk 25 likewise establishes an electrical connection between the charging cable 22 and the rechargeable battery (not illustrated) of the hybrid or battery-operated electric vehicle by a switching mechanism (likewise not shown) as soon as the charging cable 22 is completely unwound from the drum 21. The approach of the second drum end disk 25 to the inner wall of the housing 26 can be advantageously utilized for this purpose. As soon as the drum end disk 25 is removed from the inner wall of the housing 26 again when the charging cable 22 is wound on, the electrical connection is released again by the switching mechanism.

The two tension spring elements 30, which are stretched to the maximum extent in the position illustrated in FIG. 4 and which pull the drum end disk 24, the drum 21, and also the drum end disk 25 in the direction of the stop 29, serve to facilitate the process of winding the charging cable 22 onto the drum 21.

Figure 5:
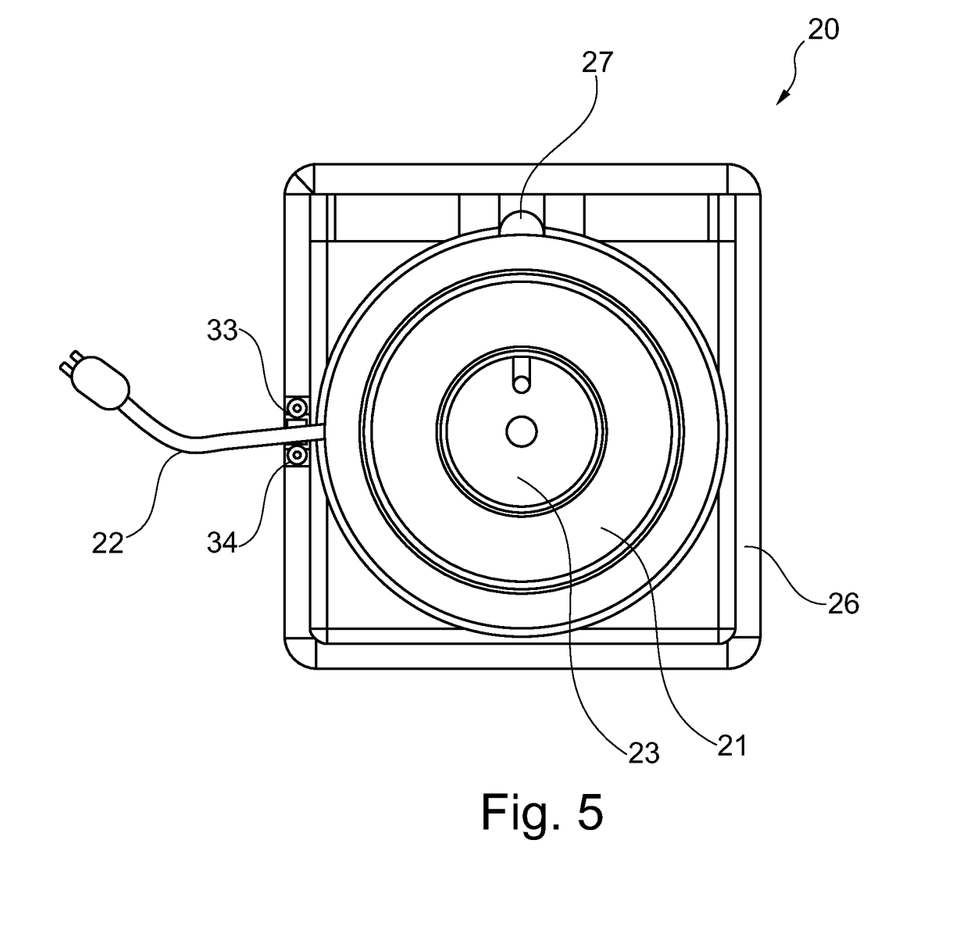
FIG. 5 schematically shows a cross-sectional view of the cable storage device illustrated in FIG. 1 from the side.

FIG. 5 illustrates the cable storage device 20 illustrated in FIG. 1 in a cross-sectional view from the side. As shown in FIG. 5, rotatable rollers 34 are provided in the edge regions of the passage opening 33. The rotatable rollers 34 allow the charging cable 22 to be easily pulled out of the housing 26 and likewise prevent damage to the charging cable 22, for example by the edges of the passage opening 33.

Figure 6:
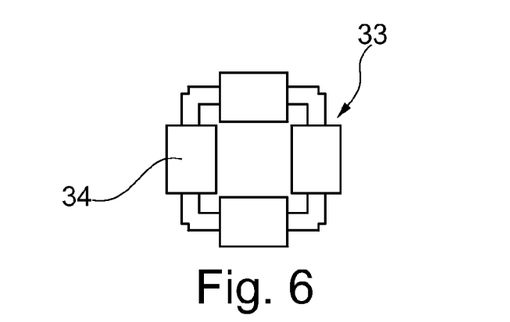
FIG. 6 schematically shows a view of a detail of the cable storage device illustrated in FIG. 1.

FIG. 6 shows an enlarged view of the rotatable rollers 34 which are mounted in the passage opening 33 of the housing 26 and through which the charging cable 22 is passed. As shown, a rotatable roller 34 is associated with each edge of the passage opening 33.

Figure 7:
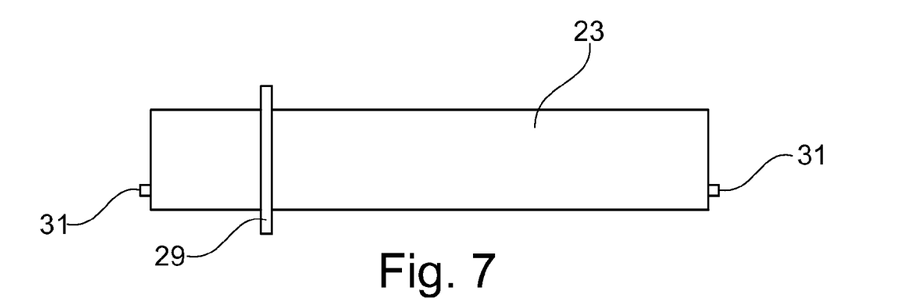
FIG. 7 schematically shows a view of a further detail of the cable storage device illustrated in FIG. 1.

FIG. 7 illustrates a view of a detail only of the shaft 23. The stop 29 which is fixedly connected to the shaft 23 is clearly shown.

Figure 8:
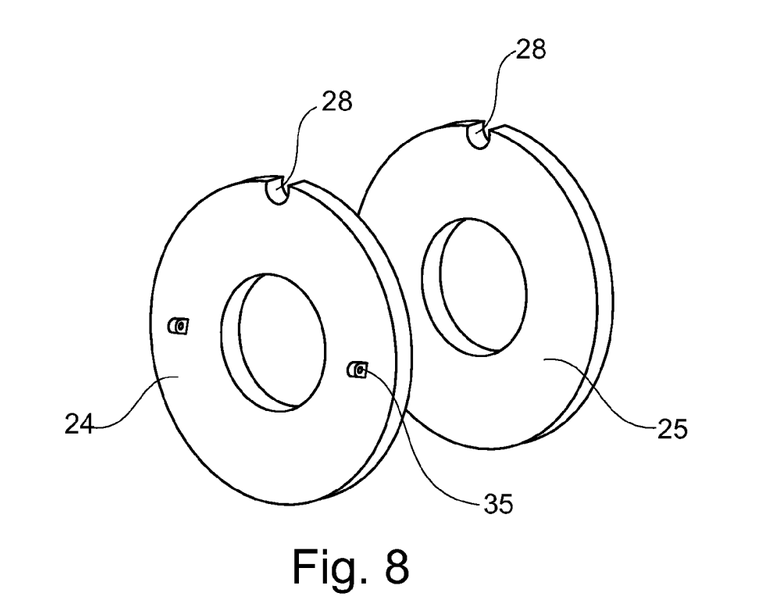
FIG. 8 schematically shows a view of a further detail of the cable storage device illustrated in FIG. 1.

FIG. 8 illustrates the two drum end disks 24 and 25 in more detail. The recesses 28 which extend radially inward from the circumferential surface of each drum end disk 24, 25 in order to receive the second shaft 27 illustrated in FIG. 1 are clearly shown. Two connecting elements 35 to which the tension spring elements 30 illustrated in FIG. 1 can be connected are likewise shown on the end face of the drum end disk 24.

The cable storage device and the hybrid or battery-operated electric vehicle according to this disclosure have been explained in detail with reference to an exemplary embodiment that is illustrated in the Figures. However, the cable storage device and the vehicle are not restricted to the embodiment described in this document, but rather further embodiments are contemplated.

In one non-limiting embodiment, the cable storage device according to the disclosure is used in a hybrid or battery-operated electric vehicle, such as an electric car, for establishing an electrical connection between the electric vehicle and a stationary power tap point.

What is claimed is:

1. A cable storage device, comprising:
   a drum; and
   a shaft that is rotationally fixed and carries said drum such that said drum is rotatable relative to said shaft, wherein said shaft includes an external thread and said drum includes an internal thread that engages said external thread.

2. The cable storage device as recited in claim 1, comprising a charging cable wound onto a circumferential surface of said drum.

3. The cable storage device as recited in claim 1, comprising a first drum end disk and a second drum end disk arranged at axial opposite ends of said drum, a diameter of said first and second drum end disks being greater than a diameter of said drum.

4. The cable storage device as recited in claim 3, wherein said first and second drum end disks are mounted in an axially displaceable but rotationally fixed manner in relation to said shaft, and said first and second drum end disks are also rotatably connected to said drum.

5. The cable storage device as recited in claim 3, comprising at least one tension spring element configured to act on an end face of one of said first and second drum end disks.

6. The cable storage device as recited in claim 3, wherein said first and second drum end disks each have a recess that extends radially inward from circumferential surfaces formed in said first and second drum end disks, and comprising a second shaft received within each of said recesses.

7. The cable storage device as recited in claim 6, wherein a radial depth of said recesses is such that a shortest distance between a circumferential surface of said second shaft and a circumferential surface of a charging cable which is received on said drum is smaller than a diameter of said charging cable.

8. The cable storage device as recited in claim 1, comprising a housing that surrounds said drum and said shaft.

9. The cable storage device as recited in claim 8, wherein said housing includes a passage opening for pulling out a charging cable carried by said drum.

10. The cable storage device as recited in claim 1, comprising a switching mechanism that establishes an electrical connection between a charging cable carried by said drum and a battery when said charging cable is completely unwound from said drum.

11. An electric vehicle, comprising:
a cable storage device that includes:
a shaft that is rotatably fixed relative to said cable storage device;
a drum rotatably connected to said shaft; and
a charging cable wound onto said drum, wherein rotary movement of said drum is transferred into axial movement of said drum relative to said shaft to wind or unwind said charging cable from said drum.

12. The electric vehicle as recited in claim 11, comprising at least one drum end disk mounted to said drum.

13. The electric vehicle as recited in claim 12, wherein said at least one drum end disk is axially displaceable but rotatably fixed relative to said shaft.

14. The electric vehicle as recited in claim 12, wherein said drum is rotatably mounted to said at least one drum end disk.

15. The electric vehicle as recited in claim 12, comprising a second shaft configured to engage said at least one drum end disk to prevent rotation of said at least one drum end disk relative to said shaft.

16. The electric vehicle as recited in claim 15, wherein said second shaft is received within a recess formed in said at least one drum end disk.

17. The electric vehicle as recited in claim 11, wherein said drum is axially movable between a first position against a stop of said shaft and a second position that is spaced from said stop.

18. The electric vehicle as recited in claim 11, comprising a housing that surrounds said drum and said shaft.

19. The electric vehicle as recited in claim 18, wherein said charging cable extends through a passage opening of said housing, at least one roller mounted within said passage opening to guide movement of said charging cable.

20. A method, comprising:
rotating a first portion of a drum relative to a shaft of a cable storage device while preventing a second portion of the drum from rotating;
axially displacing the drum relative to the shaft in response to the rotating step; and
wherein a charging cable is wound or unwound relative to the cable storage device based on the axially displacing step.

21. The method as recited in claim 20, wherein the second portion of the drum is a drum end disk.

22. The method as recited in claim 21, comprising engaging a second shaft within a recess of the drum end disk to prevent the drum end disk from rotating.

23. The cable storage device as recited in claim 1, wherein said shaft includes at least one pin-like element on an end surface of said shaft, said at least one pin-like element configured to engage a recess of a housing to prevent rotation of said shaft within said housing.

24. The cable storage device as recited in claim 1, wherein said drum includes a groove-like profile that extends in a helical pattern.

25. The cable storage device as recited in claim 1, comprising a tension spring arranged between a wall of a housing and a drum end disk of said drum, said tension spring biased such that said drum end disk bears against a stop of said shaft.

* * * * *